United States Patent Office 2,792,337
Patented May 14, 1957

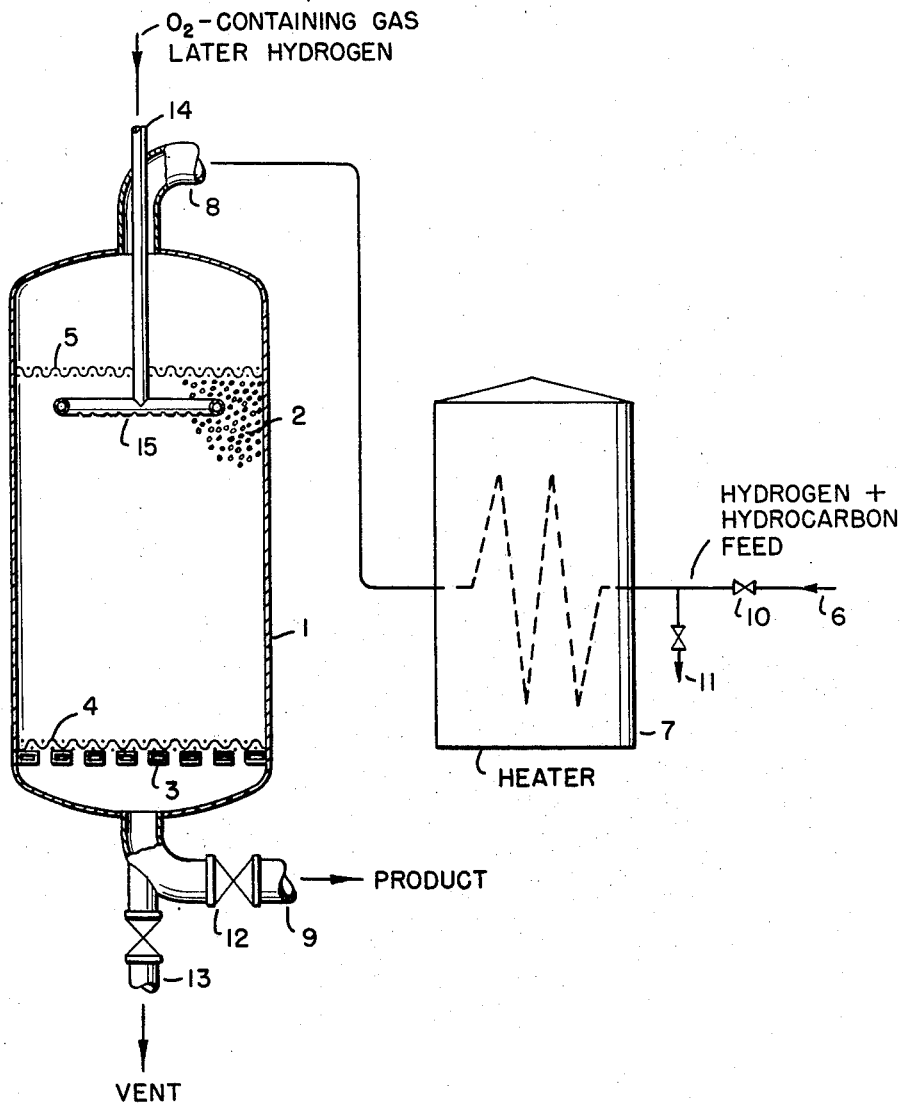

2,792,337

REFORMING OF GASOLINE WITH PLATINUM CATALYST AND METHOD OF REGENERATING THE CATALYST

Willem Frederik Engel, Amsterdam, Netherlands, assignor to Shell Development Company, Emeryville, Calif., a corporation of Delaware Application September 28, 1953, Serial No. 382,863

Claims priority, application Netherlands October 7, 1952

4 Claims. (Cl. 196—50)

This invention relates to the vapor phase reforming of gasolines and fractions thereof with platinum catalyst in the presence of hydrogen, and relates more particularly to the periodic in situ reactivation of the platinum catalyst during such operation.

The catalytic reforming of petroleum hydrocarbon mixtures boiling in the gasoline boiling range is frequently referred to as hydroforming. In hydroforming the usual technique is to vaporize and preheat the gasoline fraction to the reaction temperature which is between about 800° F. and 1000° F. and pass the thus preheated vapors with a mole excess of added hydrogen (recycle product gas) through a fixed bed of the catalyst. Although various reactions take place in the process the main reaction is the dehydrogenation of the naphthenic hydrocarbon constituents to the corresponding aromatic hydrocarbons. After a period of time the catalyst declines in activity and must either be replaced or reactivated. When using the usual hydroforming catalyst, which is a molybdena-alumina catalyst, it is necessary to reactivate the catalyst after every 4–8 hours of operation. This reactivation not only consumes a substantial part of the potential on stream time but it is also most inconvenient and costly in other respects.

Recently the industry has turned to the use of platinum catalysts in hydroforming. One process of this type is the so-called "Platforming" process; however, basically the same process is sometimes called by other trade names. This type of hydroforming process may be carried out for substantial periods of time without reactivation of the catalyst. However, the catalyst does lose activity during use and is extremely costly to replace. It would be very advantageous therefore to be able to reactivate it in situ.

It is stated in the patent literature (see, for example, U. S. Patent No. 2,479,110) that platinum catalysts used for this service may be reactivated in the manner usual for other hydroforming catalysts, which is to flush the catalyst of hydrocarbon vapors, then burn the carbonaceous deposits with a gas of controlled oxygen content, and such reactivation has in fact been carried out in laboratory operations. This reactivation has however been found to be unreliable, being ineffective in some cases in the laboratory, and ineffective when applied on the plant scale. I have found that this is not due to poorer control on the plant scale as supposed, but to traces of materials which are poisonous to the catalyst. The catalytic activity of platinum is extremely sensitive to poisons and this recognized fact is the chief reason why it was not until recently that the reforming of petroleum fractions with platinum catalyst was seriously investigated. When it is considered that the commercial platinum hydroforming catalyst contains at most 0.5% platinum, it is seen that even very small traces of poisons are capable of exerting a very detrimental effect on such catalyst.

I have found that the detrimental effect encountered in previous attempts to reactivate such catalysts in situ may be avoided if the reactivation is effected in the following different and special way while still utilizing the basic principle of burning off the carbonaceous deposits. After a period of use during which the catalytic activity has declined (process period) the reaction system, including the preheating coils, transfer lines, and reaction vessel, is flushed of combustible vapors in the usual manner, and then the oxygen-containing gas is introduced at a point intermediate the catalyst bed and the preheater tubes in such a manner that a minor part of the gas is passed backward through the preheater tubes and transfer lines, and the remainder is passed forward through the catalyst bed; this injection is continued until the catalyst bed is substantially free of carbonaceous deposits; an inert gas such as flue gas, nitrogen, carbon dioxide, or the like, is then injected until the system is flushed free of dangerous concentrations of oxygen; hydrogen-containing gas (recycle product gas) is then introduced in the same manner, part passing back through the transfer line and preheating tubes, and the remainder passing forward through the catalyst bed; then the flow of hydrogen is switched to the normal flow which is serially through the preheating tubes and the catalyst bed; reactant hydrocarbon vapors are then introduced into this last mentioned stream of hydrogen-containing gas whereupon a new process period is initiated.

The described operation reactivates the catalyst to substantially its initial activity and, unlike the conventional method, it works consistently and on a plant scale.

While it is not desired that my invention be dependent upon the correctness of any explanation for its effectiveness, it is believed upon substantial evidence that the effectiveness of the method, compared to the usual reactivation method, is due to the following: All gasoline fractions derived from petroleum contain at least traces of materials such as sulfur compounds and other impurities. Sulfur exerts only a minor non-permanent poisoning effect on the catalyst and is not particularly harmful in the process in concentrations up to about 0.1%. During normal operation the surfaces of the preheater tubes and the parts of the reactor and transfer lines constructed of ferrous metals become at least partially sulfided. When the usual method for reactivating hydroforming catalyst is applied, these metal surfaces are oxidized by the oxygen-containing gas with the liberation of traces of sulfur dioxides. The platinum catalyst catalyzes the oxidation of this sulfur dioxide to sulfur trioxide. It is believed that it is the small amount of sulfur trioxide produced in this way which has caused deactivation of the catalyst in previous attempts to reactivate the catalyst in situ. In the method of the invention this deactivation is avoided. Traces of poisons or poison precursors upon the walls of the preheater tubes, transfer lines, etc., are removed from the system without passing through the catalyst bed. It is also found that contact of the reactivated catalyst with spent reactivation gas should be avoided as far as possible. The oxygen-containing reactivation gas is therefore passed through the catalyst bed as described without fortification with additional amounts of oxygen along the path of travel.

From the above, it will be apparent that my invention resides in the particular way of introducing the oxygen-containing gas used to burn off the carbonaceous deposits from the catalyst. This method serves no useful purpose and is only an added complication if applied to the usual chromia-alumina or molybdena-alumina hydroforming catalysts since these catalysts contain much higher metal contents of the order of 10% and are furthermore not nearly so sensitive to catalyst poisons. In the case of platinum-containing hydroforming catalyst, on the other hand, where the platinum concentration is only a few tenths of a percent, the method of my invention makes it for the first time possible to reactivate such catalysts in situ on a plant scale. Thus, it makes it possible, after say six months continuous operation, to reliably reactivate the catalyst in situ to essentially its initial activity instead of having to replace it at a cost of around $4.00/pound.

The method is most effective when the catalyst is one in which the support for the platinum is alumina, or consists essentially of alumina as is the case with platforming catalyst (described in U. S. Patents No. 2,479,109 and No. 2,479,110). It is effective, but less so, with catalysts in which the platinum is supported on a base consisting predominantly of silica as, for example, the catalysts described in U. S. Patents No. 2,478,916 and No. 2,550,531. This difference, it is found, is due to the tendency for alumina in the catalyst to bind traces of sulfur trioxide produced as described.

While the manner of introducing the oxygen-containing gas is found to be most important in the reactivation of platinum catalyst in hydroforming operations, the same manner of introducing the hydrogen-containing gas after completing the burning is also of importance and constitutes a separate feature of the invention. This has nothing to do with the deactivation by traces of sulfur trioxide, but with the effect of water vapor. During normal reactivation, regardless of the particular method of introducing the oxygen-containing gas, the surfaces of the metal parts of the transfer lines, reactor, etc., are slightly oxidized. Upon reintroducing the reaction mixture of hydrocarbons and hydrogen for operation this oxide film is reduced with the liberation of traces of water vapor. Small amounts of water vapor are not very poisonous to the catalyst but, in the case of platinum catalyst promoted with halogen they are, nevertheless, very damaging as they tend to cause volatilization and loss of the halogen promoter. The described method of introducing the hydrogen-containing gas after completing the burning operation is therefore an important secondary feature of my invention which may be applied as described or applied independently.

It is to be understood that the hydroforming and reactivation are carried out in the conventional manner. These features of the operation will therefore be only briefly described.

While the process of the invention is primarily applicable in the catalytic reforming of straight-run gasolines derived from petroleum, it may also be applied with advantage for the catalytic dehydrogenation of gasolines produced in the subsequent processing of petroleum or other oil products, such as hydrocarbon distillates produced from peat, wood, brown coal, coal, bituminous shale, tar, and the like. Synthetically produced hydrocarbon distillates, such as produced from carbon monoxide and hydrogen by the Fisher-Tropsch process, may also be advantageously treated, even though they normally are substantially free of the types of impurities found in petroleum distillates. Oil fractions boiling in the ranges of naphthas, kerosene, and even somewhat heavier distillate oils may also be treated.

The hydrocarbon oil is hydroformed in the presence of hydrogen under pressure. The hydrogen need not be pure hydrogen but gas mixtures containing, for instance, over 50% by volume of hydrogen can be applied. As pointed out, the hydrogen may be recycled. The pressure is usually over two atmospheres and generally does not exceed 100 atmospheres. In the reforming of naphthas, pressure between about 10 and 20 atmospheres are generally preferred. The reaction temperature is generally between 482° F. and 1202° F., and more particularly between 887° F. and 986° F.

The catalyst to be used contains a minor amount of platinum combined with a major amount of a suitable support. An aluminum oxide having a large interior surface, of for example, at least 120 square meters per gram, is the preferred carrier material. However, other materials such as silica-alumina complexes, silica-magnesia complexes, certain activated clays, and the like, may also be used. The catalyst, particularly when the support material consists of alumina, is preferably promoted with a small amount, e. g., 0.1 to 0.5%, of halogen such as fluorine and/or chlorine. The concentration of platinum may vary from a few hundredths of a percent up to about 1 percent.

Care has to be taken that the temperature of the catalyst does not rise too much during the burning operation. Overheating of the catalyst may be prevented by controlling the quantity of the oxygen in the gas used to effect the combustion. The quantity of oxygen may be substantially constant at a low safe value, or it may be initially low, e. g., 1% by volume, and may subsequently be increased, e. g., to 4% by volume near the end of the reactivation period. The temperatures occurring locally in the catalyst bed during the reactivation with the oxygen-containing gas are difficult to determine but generally lie between about 752° F. and 1112° F. The gas may also contain azone or nitrogen dioxide in place of or in addition to the oxygen for effecting the combustion. It is generally necessary to preheat the oxygen-containing gas before it is introduced into the catalyst. The required temperature depends upon the temperature of the catalyst to be reactivated, on the nature of the carbonaceous deposits, and on the composition of the gas used. In each invidiual case of the most suitable temperature can easily be ascertained. The burning may be carried out at essentially atmospheric pressure or any other pressure as desired.

The reactivation procedure just described may be applied repeatedly at intervals ranging from about one day to several months until the catalyst has declined to an uneconomical activity due to so-called permanent deactivation, e. g., through poisoning through traces of arsenic, lead, or antimony, at which point it is necessary to replace the catalyst.

A specific example of the process of my invention follows:

The operation is the hydroforming of a straight-run fraction of Kuwait gasoline boiling between about 200° and 400° F. The catalyst employed consists of 0.3% platinum and 0.5% halogen (chlorine+fluorine) supported on an activated alumina. A conventional reaction system consisting of a preheating furnace containing preheating tubes, a transfer line, and a fixed bed reactor is used. During operation, the gasoline fraction with approximately 5 moles of hydrogen per mole of hydrocarbon is preheated to a temperature of 960° F. in the tubes of the preheating furnace and then passed in vapor phase, and at a pressure of about 700 pounds per square inch, through the catalyst bed. The vapors leaving the reactor are cooled to condense the reformed gasoline product and the product hydrogen-containing gas is separated and recycled. The feed is essentially dry and contains 0.05% sulfur. The reactor, preheating tubes, and transfer lines are constructed of chrome steel. After a period of 300 hours of operation, the activity of the catalyst has declined considerably. The flow of the hydrocarbon and recycle product gas is discontinued and the system is flushed with inert gas (flue gas). Air diluted with flue gas to an oxygen concentration of about 2% is then injected at a point near to or even within the catalyst bed and a gas outlet is provided near the inlet of the preheating tube. The flow of the air-flue gas mixture is then controlled such that part of the gas is caused to pass backwards through the transfer line and preheating tube, while the remainder passes through the catalyst bed in the normal flow direction. The oxygen-content of the gas and the rate of flow are adjusted such that the temperature does not exceed 1100° F. As soon as the combustible deposits have been removed, which may require from one to several hours, depending upon the amount of carbonaceous deposits present, the supply of air is stopped and the system is flushed free of oxygen with flue gas. The reaction mixture of hydrocarbon and hydrogen may then be reintroduced to initiate a new process period. However, in the preferred embodiment of the invention, product gas, consisting essentially of hydrogen, is first introduced in the same manner as described for the oxygen-containing gas prior to introducing the hydrocarbon feed stock. The hydrogen-containing gas is therefore likewise made to flow in part back through the transfer line and preheater tube opposite to the normal flow direction as well as forward through the catalyst bed. During this operation the temperature of the reactor may be brought to near the desired reaction temperature. The hydrogen-containing gas is passed in the described manner for a period of at least about an hour but any longer period is not detrimental and may be used. The hydrogen-containing gas used during this operation should, of course, be essentially dry. In the particular example, the hydrogen-containing product gas used is dried by passing it through a drying tower containing di-ethyleneglycol. The flow of the hydrogen-containing gas is then switched to the normal flow, which is serially through the preheater tubes, transfer line, and reactor. Hydrocarbon feed is then introduced into this stream of hydrogen-containing gas, thereby initiating a new process period.

The injection of the oxygen-containing reactivation gas (and hydrogen-containing gas) is preferably effected through a separate line, or lines, directly into the catalytic converter, but it may also be introduced into the transfer line between the preheater and reactor, preferably as near to the reactor as feasible. In the most preferred case, the oxygen-containing gas and hydrogen-containing gas are introduced by separate lines directly to the catalyst bed near the inlet thereof. The control of the backward and forward flow of the gas is, in any case, adjusted by suitable valves located at the respective outlets which, in this particular example, are located near the normal inlet to the preheater tube and near the normal outlet of the reaction vessel, respectively. Upon completion of the described steps, the normal flow of reactant vapors and hydrogen is resumed for a further process period which may extend the useful life of the catalyst from one to several weeks or even months, depending upon the severity of the processing conditions.

The process described is illustrated in the accompanying drawing which is essentially a flow diagram with the catalytic reactor shown in sectional elevation. Referring to the drawing, the reactor is a steel cylinder 1 with suitable top and bottom closures designed to withstand the considerable operating pressures involved. The catalyst pieces are disposed in a foraminous bed 2 which rests upon a suitable grid 3 and screen support 4, and is held in place by a hold-down screen 5 at the top. In operation the hydrogen gas and hydrocarbon feed entering by line 6 are pre-heated to the reaction temperature in heater 7. The pre-heated vapors then pass through the transfer line into the top of the reactor via line 8. The vapors pass down through the catalyst bed 2 and out through the product line 9 at the bottom.

To regenerate the catalyst the system is first flushed of hydrocarbon vapors with an inert gas. The feed line is blocked, as by closing valve 10 in line 6, and vent line 11 is opened. Also, the product line is blocked, as by closing valve 12 in line 9, and vent line 13 is opened. Oxygen-containing regeneration gas is then introduced via line 14. By control of the valves in vent lines 11 and 13, the regeneration gas is caused to flow in part back up through the feed line 8 to the vent 11 and in part down through the catalyst bed to vent line 13. The regeneration gas therefore does not contact parts of the reactor vessel or feed lines prior to contact with the catalyst and none of the regenerated catalyst contacts spent regeneration gas.

After completing the burning, the system is flushed of oxygen and hydrogen is substituted for the oxygen-containing gas introduced by line 14. The hydrogen therefore flows in the same manner. None of the water vapor formed by reduction of the slightly oxidized parts of the reactor is allowed to contact the catalyst, but is flushed out of the system as described.

Following the described regeneration, the original process flow is re-established and the process is continued.

The effectiveness of my described process is illustrated by the following:

The operations to be described involved the hydroforming of a straight-run naphtha from a Middle East petroleum having the following composition and properties:

| | |
|---|---|
| Aromatic | 17 percent by weight. |
| Naphthenes | 25 percent by weight. |
| Paraffins | 58 percent by weight. |
| Boiling range | 248–392° F. |
| Sulfur content | 0.1 percent by weight. |
| F–2 octane No. | 30. |

The operation was carried out with commercial platforming catalyst (described in U. S. Patent No. 2,479,110) the reactor and preheating tube being constructed of chrome-nickel-steel. The naphtha, together with 1000 liters of hydrogen per kilogram, was vaporized and preheated to 869° F., and passed at the rate of 0.6 kilogram of naphtha per liter of catalyst per hour and at 225 p. s. i. g. through a bed of the catalyst, at said temperature. The product obtained after the first 10 hours had an F–2 (research) octane number of 86. The products obtained after 100 hours and 300 hours operation had F–2 octane numbers of 83 and 77, respectively. The operation was temporarily discontinued, and the catalyst was treated in situ in the conventional manner. Thus, nitrogen containing 4% oxygen was passed through the system at atmospheric pressure at a rate to maintain maximum temperature between 932° F. and 1022° F. until the catalyst was substantially free of carbonaceous deposits after flushing out the oxygen. The hydroforming operation was then resumed. After the first 10 hours, the F–2 octane number of the product was 77, and after 50 hours it had dropped to 74.

The above operation was repeated with a fresh charge of catalyst. In this case, however, the initial process period was continued only to 50 hours instead of 300 hours so that the F–2 octane number of the product at the end of the process period was 83, and only a small amount of carbonaceous deposits were included in the catalyst. Also, in this case, the burning of the carbonaceous deposits was followed by a reduction with hydrogen at atmospheric pressure and 869° F. for 20 hours in the normal manner. In this case, upon starting a new process period, the F–2 octane number of the product after 10 hours was 82, and after 50 hours had dropped to 80. These examples illustrate the poor results obtained when it is attempted to reactivate such platinum catalyst in the conventional manner.

The above operations were repeated using a fresh charge of catalyst. After process periods of 100 and 200 hours, the catalyst was regenerated under the same conditions as in the first case except that the oxygen-containing gas (1000 liters per liter of catalyst per hour) was introduced at substantially the inlet face of the catalyst bed, and the flow was controlled in such a manner that a minor part of the gas was caused to flow backward through the preheating tube. Following this treatment, a new process period was started. The F–2 octane number of the product after 10 hours of operation was 84, and after 100 hours of operation it was 81. It will be noted that this reactivation, although it did not bring the catalyst back to its initial activity, was a substantial improvement over the results obtained in the conventional manner.

The operation was again repeated, as mentioned immediately above, except that in this case, the catalyst and preheating tube were treated with hydrogen in the manner described above prior to initiating the new process period. In this case, the hydrogen was introduced in the same manner as the oxygen-containing gas, being split into two portions which passed forward through the catalyst bed and backward through the pre-heating tube. In the subsequence process period, the F-2 octane number of the gasoline after 10 hours was 86, and after 100 hours was 83. It is thus seen that only by applying both the oxygen-containing gas and the hydrogen in the described manner was it possible to reactivate the catalyst to its initial activity and stability.

In another case, using a fresh portion of the same catalyst having a surface of about 200 square meters/gram, and using the same naphtha under the described conditions, the catalyst was reactivated after 300 hours of use. Reactivation was again carried out at the same temperature, with the same quantity of gas of the same oxygen concentration, and at the same pressure. The oxygen-containing gas was preheated in the chrome-nickel-steel preheater tube used to preheat the naphtha during processing. Upon completion of the burning treatment, the system was purged with nitrogen after which hydrogen was passed through the system for 1 hour. In the subsequent process period, the F-2 octane number of the product after 18 hours was 82, and after 50 hours, it had dropped to 76.

In comparison with the above, the same operation was repeated except that the oxygen-containing gas and the hydrogen were introduced at a point intermediate the preheating tube, and the catalyst and part of the gas made to flow back through the preheating tube. In the subsequent process period, no decrease in the activity of the catalyst was observed.

I claim as my invention:

1. In the hydroforming of a gasoline fraction with a platinum catalyst wherein the gasoline fraction to be hydroformed is pre-heated in the presence of hydrogen to a temperature in excess of 800° F. and the pre-heated vapors are then passed via a ferruginous metal feed inlet line to a catalytic convertor and through a bed of said platinum catalyst in said convertor, the improvement which comprises periodically restoring the activity of said catalyst in situ by introducing an oxygen-containing regeneration gas into said catalyst bed without prior contact with parts of the convertor and feed inlet line, passing part of said gas back through the forepart of the catalyst bed and the feed inlet line of the convertor and the remainder forward through said catalyst bed without recycling any part of said gas through said bed, continuing this introduction until the catalyst bed is substantially free of combustible carbonaceous matter, thereupon flushing the system free of oxygen with an inert gas, then introducing and flowing through the system a gas consisting largely of hydrogen in the same manner as said oxygen-containing regeneration gas, switching the flow of hydrogen-containing gas to the normal process flow which is serially through said feed inlet line and said catalyst bed and re-introducing said gasoline fraction with the hydrogen-containing gas, thereby initiating a new process period.

2. In the endothermic vapor phase reforming of a petroleum hydrocarbon mixture boiling within the gasoline boiling range with a platinum catalyst containing somewhat less than 0.5% platinum and wherein the said petroleum hydrocarbon mixture to be reformed is preheated in admixture with hydrogen to a reforming temperature between 800° F. and 1000° F. and the pre-heated vapors are then passed via a ferruginous metal feed inlet line to a catalytic convertor and through a bed of the said platinum catalyst in the convertor, the improvement comprising periodically stopping the flow of the hydrocarbon plus hydrogen mixture and flushing the system of the same, introducing an oxygen-containing regeneration gas into said catalyst bed without prior contact with parts of the convertor and feed inlet line, passing a minor part of said regeneration gas back through the forepart of the catalyst bed and said feed inlet line and the remainder forward through said catalyst bed without recycling any part of said gas through said bed, continuing this introduction and flow until the catalyst bed is substantially free of carbonaceous deposits, thereupon flushing the system free of oxygen and introducing and flowing through the system a gas consisting predominantly of hydrogen in the same manner such that part of the hydrogen is caused to flow backward through said feed inlet line and the remainder is caused to flow forward through the catalyst bed, switching the flow of hydrogen to the normal process flow which is serially through said feed inlet line and catalyst bed, and introducing said petroleum hydrocarbon mixture with said hydrogen to initiate a new process period.

3. A process according to claim 1, in which the catalyst is a minor amount of platinum and halogen supported on a major amount of alumina.

4. A process according to claim 2 in which the catalyst is a minor amount of platinum and a halogen supported on a major amount of alumina.

References Cited in the file of this patent

UNITED STATES PATENTS

| | | |
|---|---|---|
| 2,368,507 | Welty | Jan. 30, 1945 |
| 2,479,110 | Haensel | Aug. 16, 1949 |
| 2,505,871 | Trotter | May 2, 1950 |
| 2,662,861 | Riblett et al. | Dec. 15, 1953 |